(12) United States Patent
Masal et al.

(10) Patent No.: US 11,910,339 B2
(45) Date of Patent: Feb. 20, 2024

(54) METHODS AND SYSTEMS FOR UPLINK TIME SYNCHRONIZATION IN NON-TERRESTRIAL NETWORKS BASED COMMUNICATION

(71) Applicants: Centre of Excellence in Wireless Technology, Chennai (IN); Indian Institute of Technology Madras (IIT Madras), Chennai (IN)

(72) Inventors: Abhijeet Abhimanyu Masal, Chennai (IN); Priyanka Dey, Chennai (IN); Sunil Kaimalettu, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 298 days.

(21) Appl. No.: 17/451,952

(22) Filed: Oct. 22, 2021

(65) Prior Publication Data

US 2022/0132447 A1 Apr. 28, 2022

(30) Foreign Application Priority Data

Oct. 23, 2020 (IN) .............................. 202041046349

(51) Int. Cl.
*H04W 56/00* (2009.01)
*G01S 19/46* (2010.01)
(Continued)

(52) U.S. Cl.
CPC ........... *H04W 56/001* (2013.01); *G01S 19/46* (2013.01); *H04B 7/18513* (2013.01); *H04L 5/0048* (2013.01)

(58) Field of Classification Search
CPC ........... H04W 56/001; H04W 56/0045; H04W 56/0005; H04W 56/006; H04W 56/005;
(Continued)

(56) References Cited

U.S. PATENT DOCUMENTS 11,394,459 B2 * 7/2022 Kusashima ........ H04B 7/18504
2016/0183204 A1 6/2016 Seo
(Continued)

FOREIGN PATENT DOCUMENTS

WO WO-2019/195457 A1 10/2019

*Primary Examiner* — Lana N Le
(74) *Attorney, Agent, or Firm* — Alston & Bird LLP

(57) ABSTRACT

A system and a method for performing uplink (UL) time synchronization in non-terrestrial networks (NTN) include Performing Downlink (DL) synchronization SSB signals. At least one information is received by a UE 102 from an NTN BS 104. A location information of a satellite is obtained using the at least one information received by the UE 102. Location of the UE 102 is estimated using one of GNSS receiver of the UE 102 and by processing at least one reference signal received by the UE 102 from multiple NTN-BS 104, using at least one multilateration technique and RTK. Timing Advance (TA) estimate is determined using the location of the satellite and location of the UE 102. TA applied is determined using the TA estimate and TA margin. PRACH is transmitted based on the TA applied and an information related to the TA applied is reported to the NTN-BS 104. Residual TA is estimated using the reported information related to the TA applied and the detected PRACH. The residual TA is indicated to the UE 102 for subsequent UL transmissions, in order to achieve the UL
(Continued)

time synchronization in the NTN based communication network.

12 Claims, 11 Drawing Sheets

(51) Int. Cl.
*H04L 5/00* (2006.01)
*H04B 7/185* (2006.01)

(58) Field of Classification Search
CPC .......... H04W 56/0015; H04W 56/004; H04W 56/00; H04W 74/004; H04W 56/0055; H04W 72/1268; H04W 4/029; H04W 56/0065; H04W 74/0891; H04W 56/0075; H04W 4/025; H04W 4/02; G01S 19/46; G01S 19/38; G01S 5/0036; H04B 7/18513; H04B 7/1851; H04B 7/185; H04B 7/1853; H04B 7/18589; H04B 7/18504; H04L 5/0048; H04L 5/0078
See application file for complete search history.

(56) References Cited

U.S. PATENT DOCUMENTS

| | | | |
|---|---|---|---|
| 2021/0377825 A1* | 12/2021 | Deenoo | H04B 7/18513 |
| 2022/0046566 A1* | 2/2022 | Leng | H04B 7/1851 |
| 2022/0086780 A1* | 3/2022 | Tsai | H04B 7/1851 |
| 2022/0150858 A1* | 5/2022 | Ren | H04W 56/0005 |
| 2022/0263570 A1* | 8/2022 | Wang | H04B 7/185 |
| 2023/0224972 A1* | 7/2023 | Cheng | H04W 74/004 |
| | | | 370/329 |

* cited by examiner

METHODS AND SYSTEMS FOR UPLINK TIME SYNCHRONIZATION IN NON-TERRESTRIAL NETWORKS BASED COMMUNICATION

CROSS REFERENCE TO RELATED APPLICATIONS

The present application claims priority to and the benefit of Indian Patent Application No. IN 202041046349, filed Oct. 23, 2020; the entire contents of which as are hereby incorporated by reference herein in their entirety.

FIELD OF INVENTION

The present invention generally relates to a method and a system for performing uplink time synchronization. More specifically, the present invention depicts methods and a system for performing uplink time synchronization in non-terrestrial network networks.

BACKGROUND

A Non-Terrestrial network (NTN) refers to a network or a segment of networks using Radio Frequency (RF) resources on board a satellite, High Altitude Platforms (HAPS) or an Unmanned Aircraft System (UAS) platform. Integration of NTN system with Terrestrial Network (TN) systems is being studied in 3GPP Rel. 17 for coverage extension and enhancement.

Typically, an NTN can be classified into a transparent payload NTN system 100 and a regenerative payload NTN system 200 as illustrated in FIGS. 1 and 2 respectively. The transparent payload NTN system 100 and the regenerative payload NTN system 200 both include one or more UE 102 and one or more UAS (alternatively referred as satellites or HAPS) 104 (also denoted as 104-*a* and 104-*b* in FIG. 2). The UE 102 and the satellite 104 communicate with each other through a service link 106. The satellites 104, 104-*a*, 104-*b* communicate with a Satellite Gateway (SAT-GW) 108 through a feeder link 110. The satellites 104-*a*, 104-*b* present in same constellation are connected with an inter satellite link 112. The SAT-GW 108 is connected with a base station i.e. gNB 114 through a gNB-gateway link 116. The gNB 114 is further connected with a data network 118.

A transparent payload satellite such as the satellites 104 has radio frequency filtering, frequency conversion, and amplification capabilities. Hence, a waveform signal repeated by the payload is un-changed. Whereas, a regenerative payload satellite such as the satellites 104-*a*, 104-*b* contain radio frequency filtering, frequency conversion, and amplification as well as demodulation/decoding, switch and/or routing, coding/modulation capabilities which is equivalent to having all or part of functions of a base station e.g. NB, eNB, gNB on board the satellite (or a UAS platform). The terms gNB and Base Station (BS) are interchangeably used throughout the disclosure.

There can be different types of satellites as mentioned below in Table 1.

TABLE 1

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position | 200-3500 km |
| UAS platform (including HAPS) | 8-50 km (20 km for HAPS) | fixed in terms of elevation/azimuth with respect to a given earth point | 5-200 km |
| High Elliptical Orbit (HEO) satellite | 400-50000 km | Elliptical around the earth | 200-3500 km |

FIGS. 3A and 3B depict user plane protocol stack control plane protocol stack respectively of a transparent payload satellite, in accordance with an embodiment of the present disclosure. In the user plane protocol stack, as illustrated in FIG. 3A, Protocol Data Unit (PDU) session is maintained between 5G core network (5GC) Application Management Functions (AMF) to the UE Non-Access Stratum (NAS) through usual protocol stack as GTP-U, UDP IP L1, L2, at AMF and SDAP, PDCP, RLC, MAC and PHY at the gNB and at the UE in New Radio (NR). Stacks in the NTN gateway and the satellite are transparent to the AMF, gNB, and UE. Similarly, the control plane protocol stack as illustrated in FIG. 3B includes NGAP, SCTP IP, L2, L1 at AMF whereas, NGAP, SCTP, IP PHY, MAC RLC PDCP and RRC at the UE and the gNB.

FIGS. 4A and 4B illustrate user plane and control plane respectively of a NG-RAN protocol architecture for a regenerative satellite, in accordance with an embodiment of the present disclosure. The difference in regenerative payload satellite is that the gNB is present in the satellite. Therefore, the gNB stacks of the user and control plane present in the satellite depends on the split that is being adopted. The regenerative payload satellite includes UE, satellite with on board gNB-DU, NTN gateway, gNB-CU, and 5G Core User Plane Function (5GC UPF). As illustrated in FIGS. 4A and 4B, the gNB is split into distributed unit (DU) and central unit (CU). DU resides in the satellite while the gNB-CU is present on the ground. The CU and the DU are connected by an F1 interface as in the case of terrestrial networks through the SAT-GW.

Terrestrial cellular networks work on the principle of coherent transmission and reception for which a transmitter and a receiver need to be synchronized in time with each other. In $3^{rd}$ Generation Partnership Project (3GPP) standards, a BS takes care of establishing such a synchronization. During initial search, a UE generally searches for the Downlink (DL) synchronization signals like Primary Synchronization Signal (PSS), Secondary Synchronization Signal (SSS), and Synchronization Signal Block (SSB). Further, the UE acquires primary knowledge of the BS transmission like carrier frequency, bandwidth, subcarrier spacing, initial master broadcast information etc. The DL synchronization is performed to align the UE's reception boundaries with the DL symbols received. Further, the UE performs the uplink (UL) synchronization using some specific reference signal called as Physical Random-Access Channel (PRACH) preambles.

Uplink (UL) synchronization is performed to adjust the UE's symbol transmission boundary in such a way that when the symbol is received at the BS, its boundary is aligned with the BS reception symbol boundary. 3GPP systems are mostly Orthogonal Frequency Division Multiplexing (OFDM) systems in which this alignment happens in an OFDM symbol level. The BS receives the PRACH preamble, which is transmitted by the UE with the DL reception timing as a reference and without considering the propagation delay between the BS and the UE (i.e. Timing Advance=0).

New Radio (NR) supports long and short types of PRACH formats. General design of the PRACH preamble is shown in FIG. 5. A Cyclic Prefix (CP) and a guard period per PRACH duration will maintain an uncertainty window for PRACH preamble reception at the BS. It is expected that the preamble from the UE should be received within this window at the BS since in the PRACH transmission the initial Timing Advance (TA) assumed is zero. Table 2 provided below mentions the CP and the guard period for different preamble formats in NR. The BS measures the deviation of PRACH preamble reception in time over this window and considers this as a Round-Trip Time (RTT) between the BS and the UE. Thus, using the PRACH preamble, the BS finds out the propagation delay and the required TA (TA=2×propagation delay) that the UE needs to consider for its UL transmission. TA is utilized as shown in the FIG. 6, where $N_{TA}$ denotes the TA provided by the BS and Tc denotes sampling time.

TABLE 2

| PRACH Format | CP Length | Guard period |
|---|---|---|
| Long Format | | |
| 0 | 0.132 ms | 0.0969 ms |
| 1 | 0.6849 ms | 0.7162 ms |
| 2 | 0.1527 ms | 0.9533 ms |
| 3 | 0.1032 ms | 0.0964 ms |
| Short Format | | |
| A1 | 9.4 us × $2^{-\mu}$ | — |
| A2 | 18.8 us × $2^{-\mu}$ | — |
| A3 | 28.1 us × $2^{-\mu}$ | — |
| B1 | 7 us × $2^{-\mu}$ | 2.3 us × $2^{-\mu}$ |
| B2 | 11.7 us × $2^{-\mu}$ | 7 us × $2^{-\mu}$ |
| B3 | 16.4 × $2^{-\mu}$ | 11.7 × $2^{-\mu}$ |
| B4 | 30.5 us × $2^{-\mu}$ | 25.8 × $2^{-\mu}$ |
| C0 | 40.4 us × $2^{-\mu}$ | 37 us × $2^{-\mu}$ |
| C1 | 66.7 us × $2^{-\mu}$ | 94.8 us × $2^{-\mu}$ |

For a terrestrial network, PRACH design is adopted in such a way that the BS can compensate the TA from the UE at a maximum distance of 300 km for Frequency Range 1 (FR 1) and 20 km for Frequency Range 2 (FR 2). In NR, this range decreases with increase in carrier frequency band.

In 3GPP NTN, the initial standardization work has focused on the Low-Earth Orbit (LEO) satellites and the Geostationary Earth Orbit (GEO) satellites with typical altitudes of 600 to 1200 km for the LEO and 35687 km for the GEO. Due to very high distance from the earth's surface (i.e. from the UE), the propagation delays are in the range of 12.89 ms (for 600 km) and 20.89 ms (for 1200 km) for the LEO and 270.73 ms for the GEO in regenerative payload type, whereas in the case of transparent payload values will be approximately doubled. Designing the PRACH similar to 3GPP NR implies that the PRACH should have duration from 100 ms to more than a second in some cases, which is impractical as the CP duration needs to scale according to the propagation delays in the NTN.

The LEO and the GEO satellites will be simultaneously serving a particular area on earth using different beams as shown in FIG. 7. The beam footprint radius can vary from 100 to 1000 km for the LEO satellites and 200 to 3500 km for the GEO satellites. Hence, the maximum differential propagation delays within a cell between the UEs could be 3.12 ms and 3.18 ms for the 600 km and 1200 km LEO respectively and 10.3 ms for the GEO satellites. Due to such huge delay, the UL synchronization becomes critical in NTN system design and hence it is necessary to design the PRACH of a large duration, which is a large overhead. However, for better compatibility between the TN and the NTN systems, the present PRACH design should be reused as much as possible. Therefore, there is a need to design methods to reuse the same PRACH design for NTN.

Random Access Channel (RACH) procedure generally consists of four steps or messages including (1) preamble transmission, (2) Random Access Response (RAR), (3) scheduled UL transmission, and (4) contention resolution. The messages 1 and 3 are sent from the UE to the BS whereas the messages 2 and 4 are sent from the BS to the UE. In NR, the message 2 contains 12 bits for TA field, which is not extendable, and provides a maximum delay value in the range of 0 to $2*2^{\mu}$ ms ($\mu$ is numerology index as per NR) i.e. 2 ms for 15 KHz Sub-Carrier Spacing (SCS) and 0.125 ms for 240 KHz SCS as the maximum value. This value is designed for maximum 1 ms propagation delay, which is corresponding to the 300 km PRACH coverage. Similarly, the maximum CP length for PRACH preambles in NR is maximum 0.685 ms (format 1), which will support 250 km coverage for FR1 and 0.0667 ms for FR2 which supports 20 km coverage. Although this is far less than what is required for the NTN systems, methods to reuse the same number of bits needs to be explored to limit the signalling changes in NR NTN for RAR message.

Therefore, the RACH procedure needs a new design to include a large delay and at the same time limit the changes in the NR RACH messages for ensuring TN-NTN compatibility. For this purpose, the UE can be assumed with Global Navigation Satellite System (GNSS) capability and NTN-BS/satellite will broadcast its location and velocity explicitly or implicitly. With GNSS, the UE can estimate its own location and using the broadcasted information, it can estimate the BS location. Using this information, the UE can further estimate the TA value a priori and perform the TA pre-compensation. However, due to different UE classes and complexity, one cannot assume that the pre-compensation of TA at UE will be accurate to a desired level as compared with the BS based TA compensation mechanism due to ionospheric loss, tropospheric loss, multipath, UE/NTN-BS clock difference, NTN-BS mobility etc. Therefore, it is necessary to involve NTN-BS/satellite in this process since the NTN-BS/satellite should provide the final correction value to the UE even though the UE does the pre-compensation. Similarly, as explained before, one more requirement in NTN and TN systems integration is that specification should strive for common solution for both systems with minimal difference between the TN and NTN specification for TN-NTN compatibility. Therefore, utilizing the same mechanism as in NR with minimal modifications is necessary.

One more requirement in NTN and TN systems integration is that the specifications should strive for a common solution for both the systems with minimal difference between the specifications. Therefore, utilizing the same mechanism as in NR with minimal modifications is necessary.

Another issue in NTN, especially in the LEO constellation, is that the satellite will be in motion with a high speed of approximately 7.5 km/s. Therefore, the TA value updated by the NTN-BS may not be valid for a longer time. Hence, it is necessary to estimate the rate of change of TA for accurate adjustment of TA at the UE side.

Therefore, there is a need for a method and system to address high differential propagation delay in NTN and to minimize the duration of PRACH for NTN. Further, there is a need to minimise the effect of TA estimation error due to the UE limitations. Additionally, there is a need for a PRACH design, which needs to be reused for ensuring better compatibility between TN and NTN and to minimize the signalling impact in NR.

OBJECTS OF THE INVENTION

An object of the present invention is to provide a system and method for uplink time synchronization in Non-Terrestrial Networks (NTN) based communication.

Another object of the present invention is to provide a system and method for minimizing the duration of Physical Random-Access Channel (PRACH) for NTN.

Yet another object of the present invention is to provide a system and method for minimizing the effect of User Equipment (UE) timing estimation error in the Timing Advance (TA) measurement due to the UE limitations.

Another object of the present invention is to minimize the signalling impact in 3GPP New Radio (NR) by reducing the modification and reusing the NR TA mechanism.

SUMMARY OF THE INVENTION

The summary is provided to introduce aspects related to methods and systems for uplink time synchronization in non-terrestrial networks based communication, and the aspects are further described below in the detailed description. This summary is not intended to identify essential features of the claimed subject matter nor is it intended for use in determining or limiting the scope of the claimed subject matter.

The present invention relates to a system and a method for performing Uplink (UL) time synchronization in a Non-Terrestrial Network (NTN) based communication network. The method comprises performing Downlink (DL) synchronization using Synchronization Signal Block (SSB) signals. A UE receives at least one information from an NTN-Base Station (BS) and a location information of a satellite is obtained using the at least one information received by the UE. Location of a UE is estimated using one of Global Navigation Satellite System (GNSS) receiver of the UE and by processing at least one reference signal received by the UE from multiple NTN-BS, using at least one multilateration technique and Real-Time Kinematic (RTK).

Timing Advance (TA) estimate is determined using the location of the satellite and location of the UE. TA applied is determined using the TA estimate and TA margin. The TA margin is a value ranging from zero to a step size (TAstep). The Physical Random Access Channel (PRACH) is transmitted by the UE, based on the TA applied, and an information related to the TA applied is reported to the NTN-BS, by the UE. The NTN-BS estimates the residual TA using the reported information related to the TA applied and the detected PRACH. The residual TA is indicated to the UE for subsequent UL transmissions, thereby achieving the UL time synchronization in the NTN based communication network.

In one aspect, the at least one information received from the NTN-BS comprises at least one of the satellite ephemeris, location coordinates, velocity magnitude and vector, clock timing reference, source of reference, minimum and maximum TA per beam or cell, TA margin, step size, rate of change of satellite location co-ordinates, satellite velocity vector with reference co-ordinates, rate of change of minimum TA, rate of change of maximum TA, feeder link delay including BS-Satellite Gateway (SAT-GW) delay, and rate of change of feeder link delay.

In one aspect, the at least one information is signalled by the NTN-BS over at least one of the broadcast channel and UE specific control channel.

In one aspect, the TA estimate is quantized based on at least one of the predefined step size (TAstep) and minimum TA signalled to the UE.

In one aspect, the minimum TA is the minimum timing advance from the NTN-BS to the Earth's surface within its footprint.

In one aspect, the predefined TAstep is configured as one of a cyclic prefix duration (Tcp) associated to a possible PRACH configuration and step size provided in the broadcast information. One of the possible PRACH configuration is configured PRACH configuration.

In one aspect, the information related to the TA applied is reported to the NTN-BS as a number of step size.

In one aspect, the number of step size is determined as a factor of the TA estimate and the TAstep.

In one aspect, the information related to the TA applied is updated based on a relative velocity of the satellite with UE, determined using at least one of the rate of change of satellite location co-ordinates, satellite velocity vector with reference co-ordinates, rate of change of minimum TA, rate of change of maximum TA, and rate of change of feeder link delay.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION OF THE INVENTION

Figure 1:
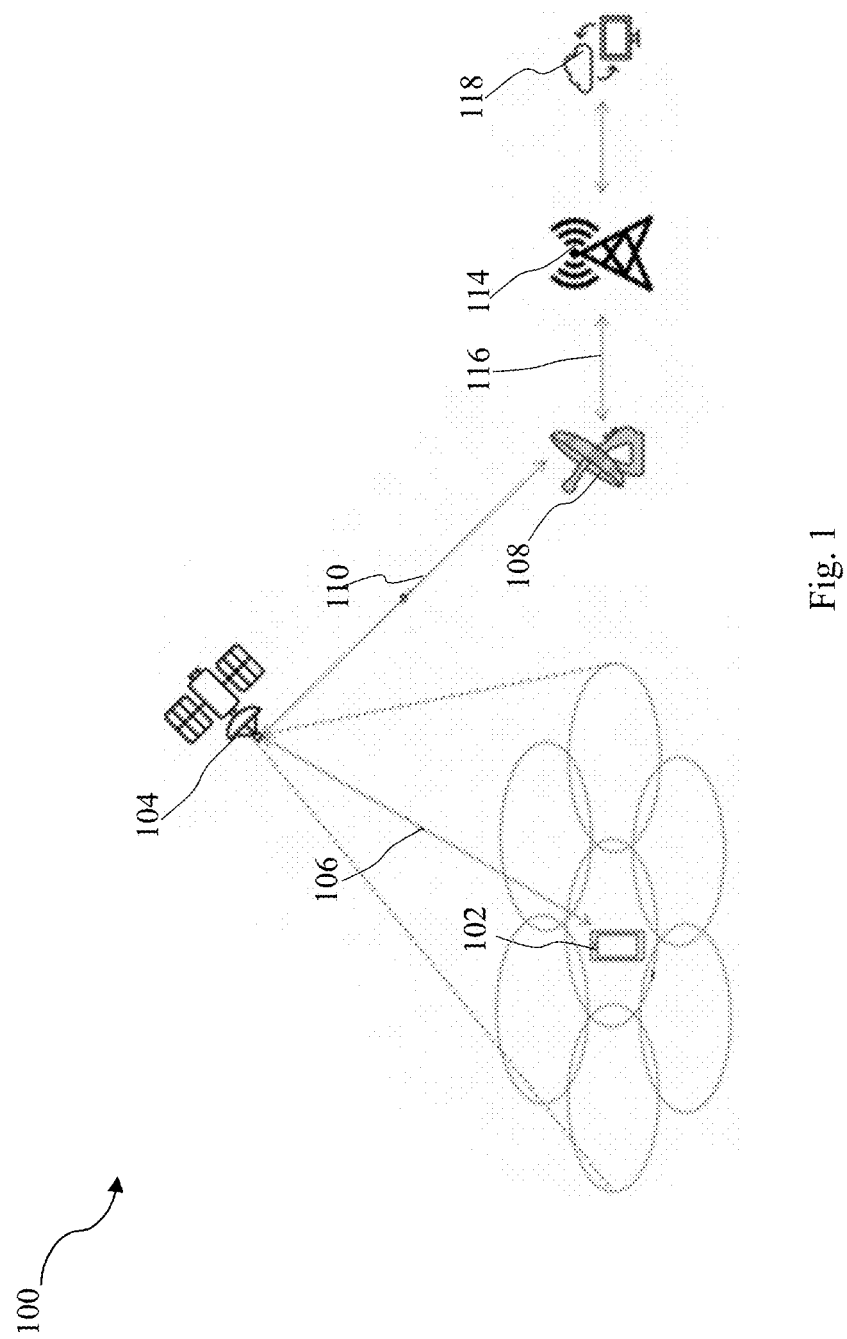
FIG. 1 illustrates a transparent payload Non Terrestrial Network (NTN) system, in accordance with an embodiment of the present disclosure.
Figure 2:
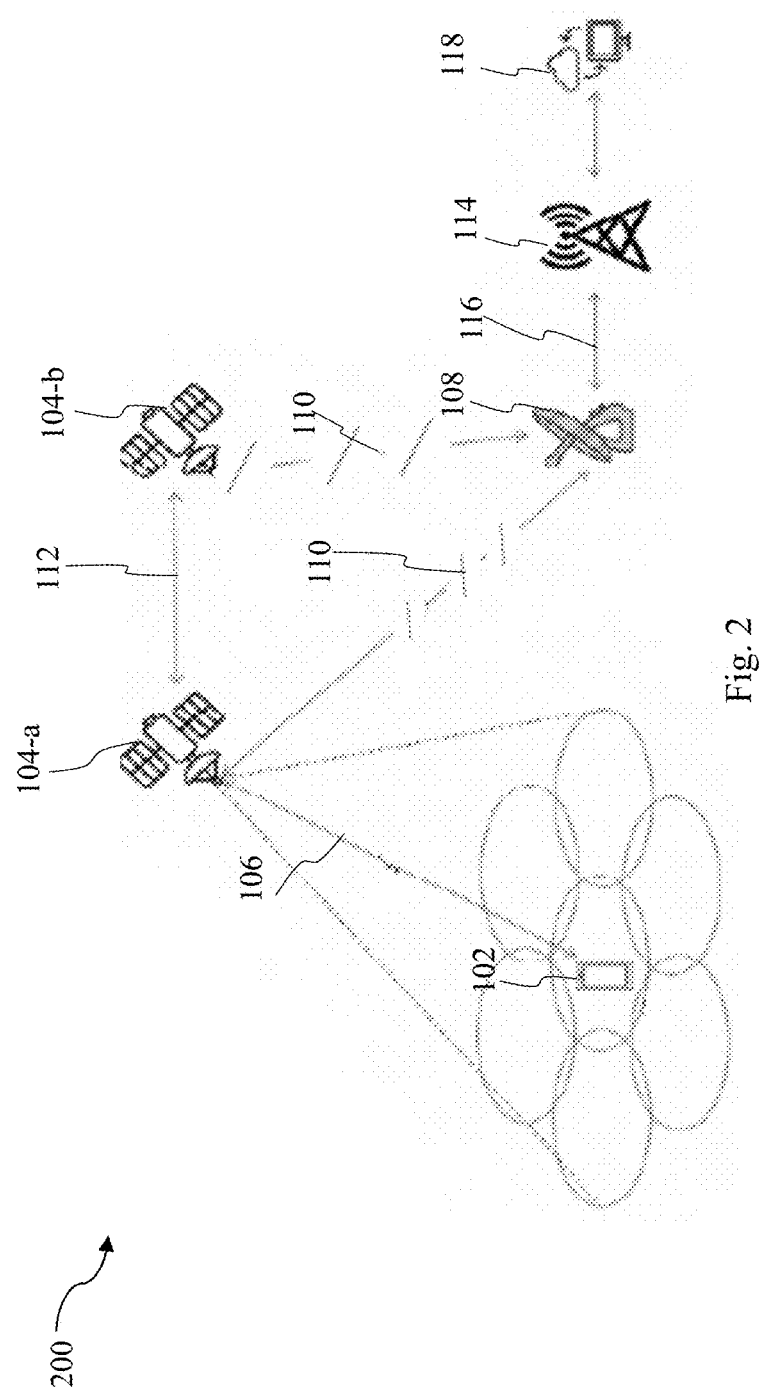
FIG. 2 illustrates a regenerative payload NTN system, in accordance with an embodiment of the present disclosure.
Figure 3A:
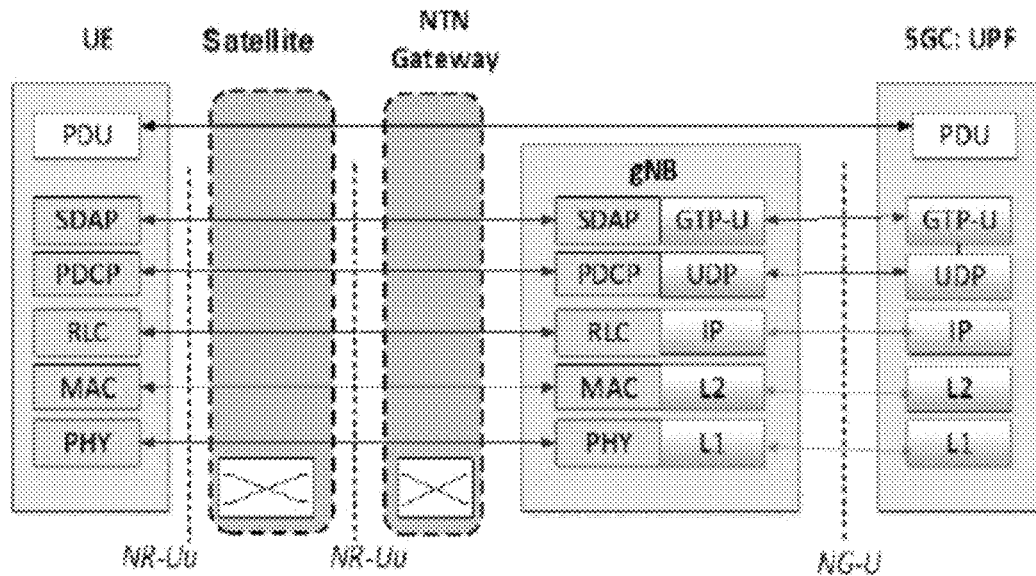
FIGS. 3A and 3B illustrate a user plane and a control plane protocol stack respectively of a transparent payload satellite, in accordance with an embodiment of the present disclosure.
Figure 3B:
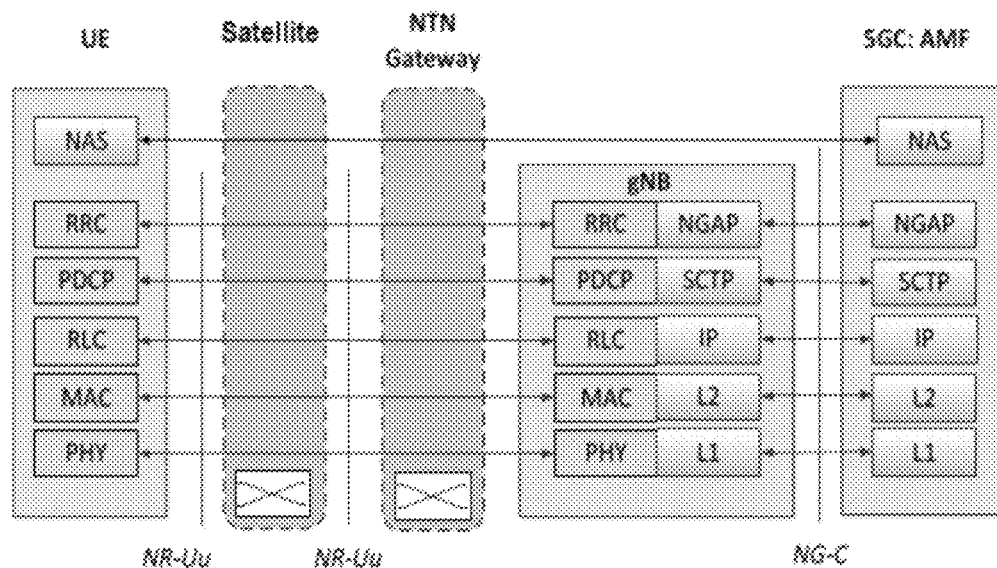
Figure 4A:
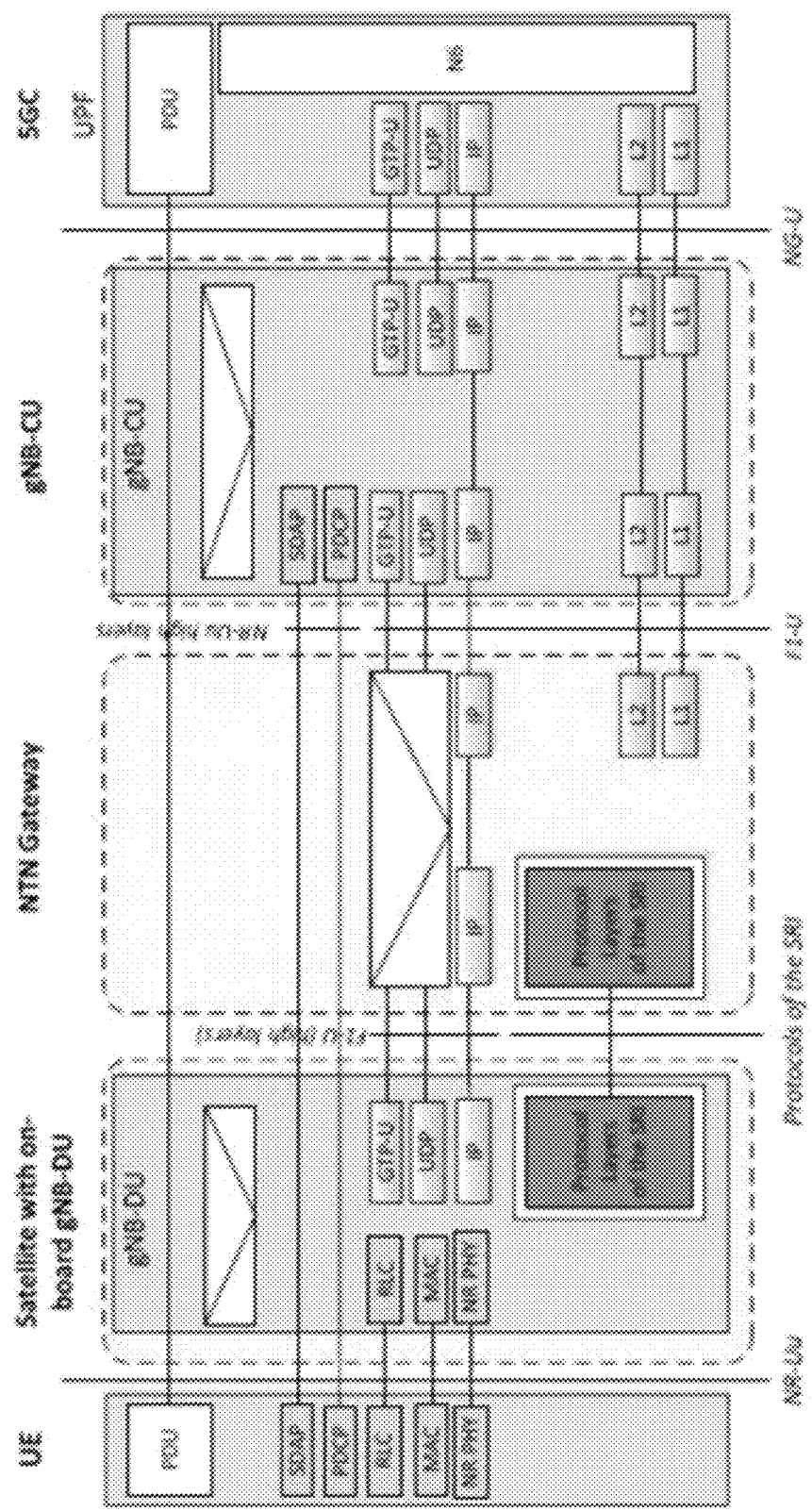
FIGS. 4A and 4B illustrate user plane and control plane respectively of a NG-RAN protocol architecture for a regenerative satellite, in accordance with an embodiment of the present disclosure.
Figure 4B:
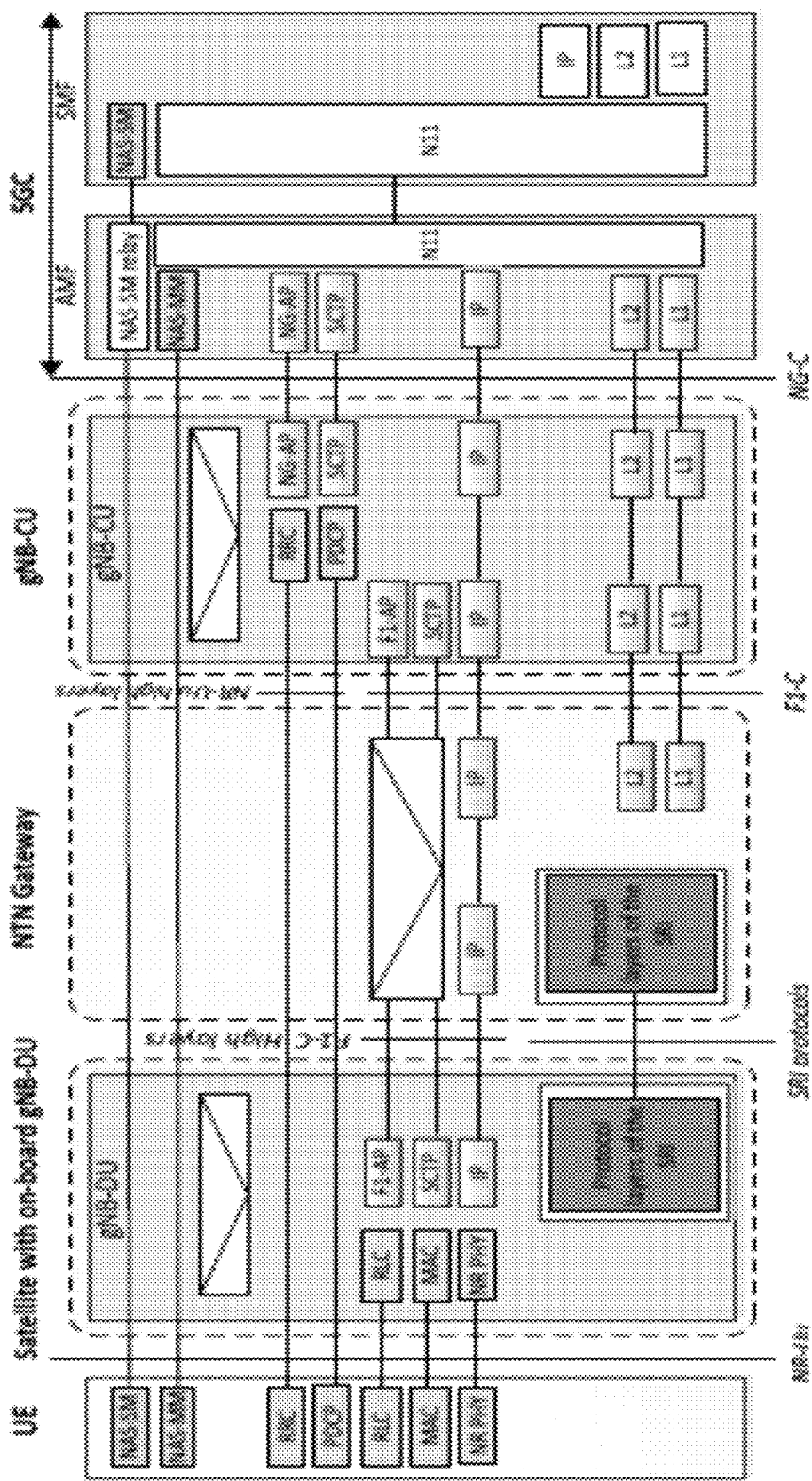
Figure 5:
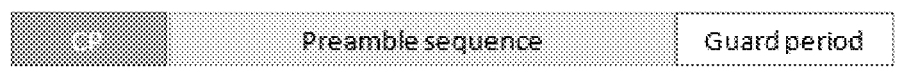
FIG. 5 illustrates an exemplary illustration of a PRACH preamble design, in accordance with an embodiment of the present disclosure.
Figure 6:
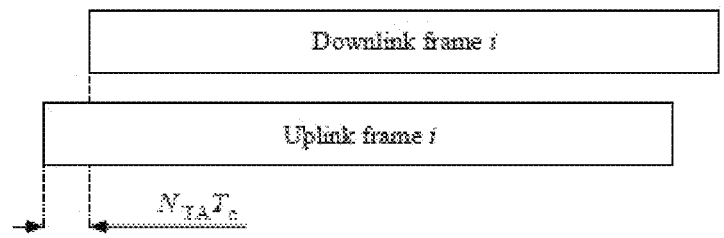
FIG. 6 illustrates an exemplary illustration of an uplink-downlink Timing Advance (TA) relation, in accordance with an embodiment of the present disclosure.
Figure 7:
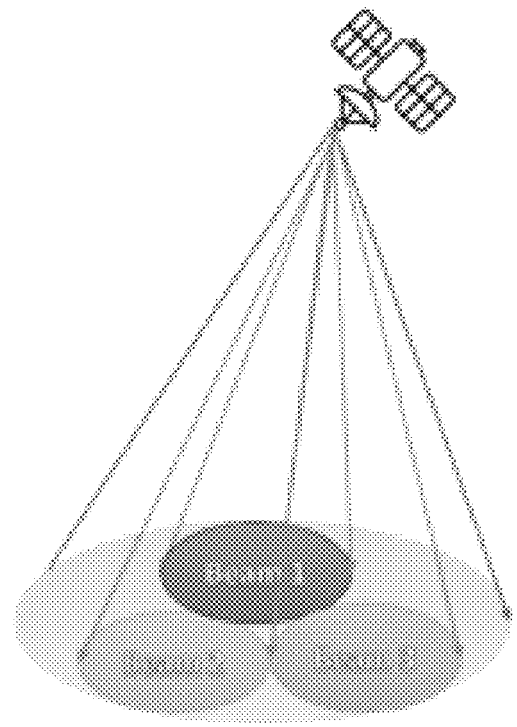
FIG. 7 illustrate an NTN satellite with multiple beams within a cell, in accordance with an embodiment of the present disclosure.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

The proposed disclosure depicts a method in which the Non Terrestrial Network NTN-gNB will have its own accurate location and velocity. In practice, the NTN-satellite will know its location with accuracy in meters and they will have mechanism to correct its location with the help of onboard Global Navigation Satellite System (GNSS) receiver and ground stations (master Earth Stations) periodically. Similarly, the NTN-gNB will acquire the knowledge of maximum and minimum distance from the NTN-satellite to the Earth's surface within its footprint i.e. beam coverage. This can be preconfigured in the NTN-gNB based on the trajectory information with possible beam footprints on earth. The NTN-gNB can calculate the minimum and maximum values of Timing Advance ($TA_{min}$ and $TA_{max}$) that corresponds to minimum and maximum distance from the NTN-satellite to the Earth's surface within its footprint. The $TA_{min}$ and $TA_{max}$ are equal to twice of the minimum and maximum propagation delays within the footprint. NTN-gNB will convey the $TA_{min}$ to all UEs within the serving beam/cell as broadcast message in Master Information Block (MIB) and/or System Information Block (SIB). There can be two types of UEs based on capability of acquiring its own position, UEs with GNSS capability and UEs without GNSS capability.

In one embodiment, GNSS capable UEs will be capable of determining the Timing Advance (TA) on their own but may under or overestimate the TA due to limitation of receiver complexity at the UE side. It depends on the reference information that the NTN-gNB transmits over broadcast channel to convey its location information in terms of actual location co-ordinates or reference time used to transmit OFDM symbols from the NTN-gNB. The UE can calculate its location accurately within less than 10 m accuracy as per present GPS capability, but it's not assured that the NTN-gNB location co-ordinates or ephemeris will be decoded with same accuracy at the UE. Similarly, there will be some other error sources like Ionospheric loss, tropospheric loss, multipath, UE/NTN-gNB clock difference, NTN-gNB mobility etc. These factors lead to estimation error in the NTN-gNB location or final TA value calculation. Therefore, there will be high chance of overestimation or underestimation of TA at the UE. To avoid such challenges, the UE will estimate the approximate TA (error prone) and then the NTN-gNB will convey the procedure to refine it in certain way. One more limitation on the TA correction in RAR MAC-CE message bits as mentioned before is that it will have always positive range (NR design with no extension possible to the message field). Therefore, UE should decide the final TA to be applied based on estimated TA ($TA_{est}$), $TA_{min}$ and the CP length of the PRACH configured. This invention proposes different methods to calculate this $TA_{applied}$ value and conveying to the NTN-gNB.

As mentioned above, the NTN-gNB will have multiple beams per cell. UEs try to receive the DL synchronization signal from the NTN-gNB within the coverage and perform the downlink synchronization using SSB and decode the MIB carrying the initial system information common for all UEs. Then, the UE decodes the other system information block for establishing the UL synchronization. The NTN-gNB will transmit its ephemeris or location coordinates and velocity vector information in one of these NTN specific broadcast channels i.e. MIB, SIBs or dedicated NTN SIB. In case the NTN-gNB and the UE has the same GNSS system, the NTN-gNB can convey the reference time used in the NTN-gNB transmission alignment over the same broadcast channel. Similarly, the NTN-gNB broadcasts the $TA_{min}$ and $TA_{max}$ over the broadcasting channel. For transparent payload type NTN deployment, the feeder link delay, and the SAT-GW to the gNB delay will also be broadcasted. In another way, the NTN-gNB can broadcast the $TA_{min}$ and $TA_{max}$ including the feeder link delay and the SAT-GW delays if they are present. Once the UE receives this information, the UE will try to estimate the TA using this information. The methods for estimating TA at the UE are described henceforth.

Figure 8:
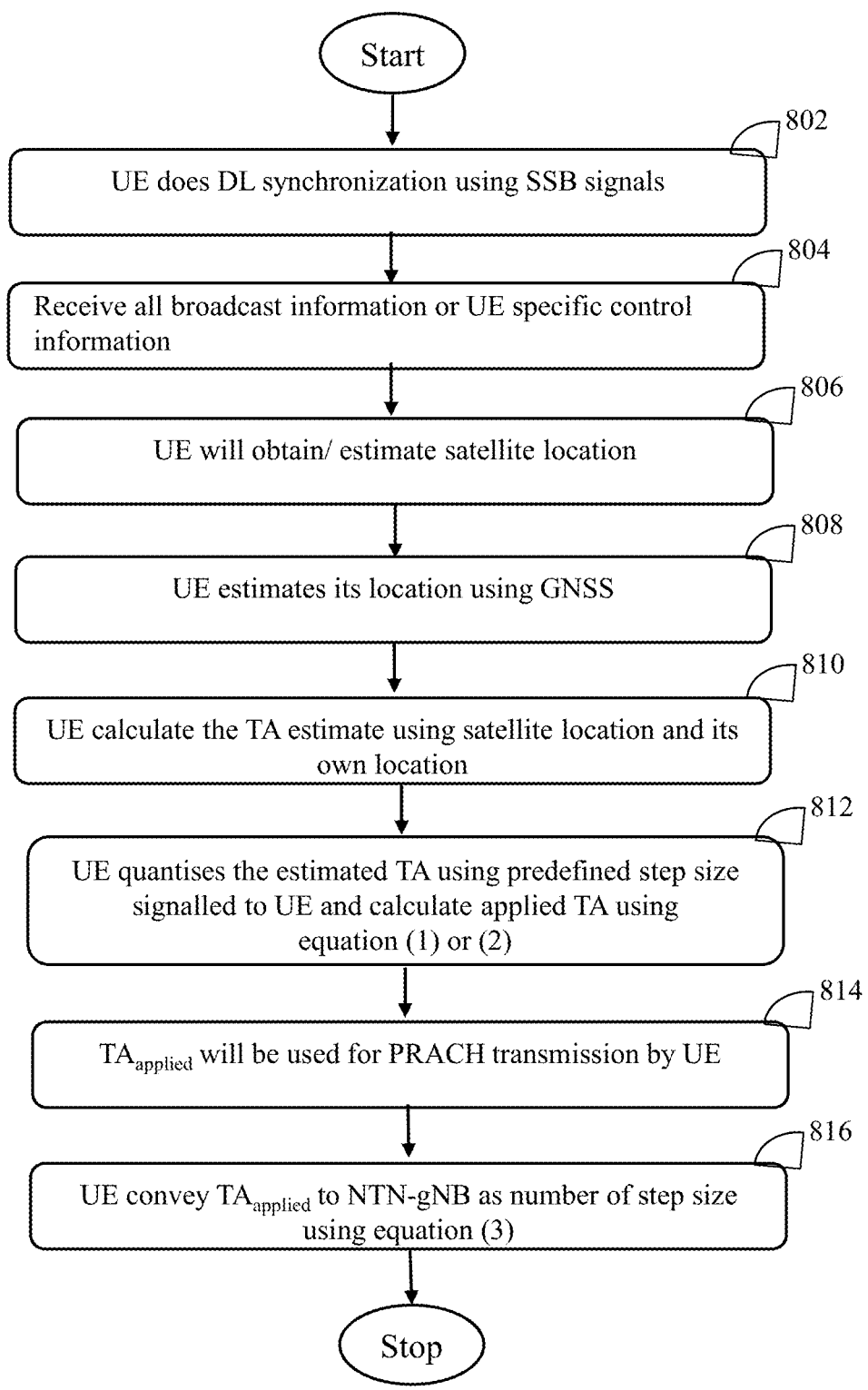
FIGS. 8-10 illustrate flowcharts of different methods of determining TA by a UE having Global Navigation Satellite System (GNSS) capability, in accordance with different embodiments of the present disclosure.
Figure 9:
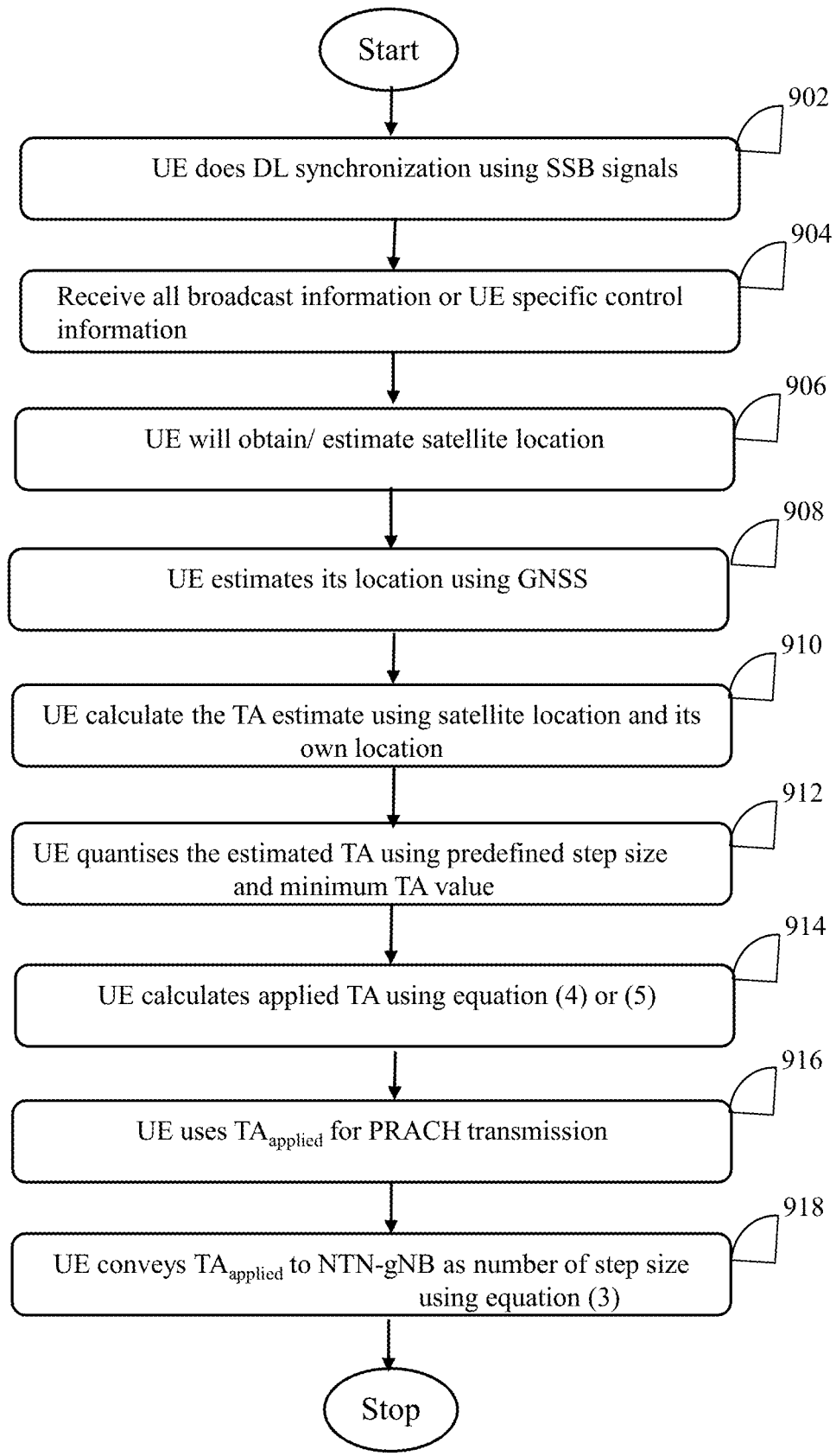
Figure 10:
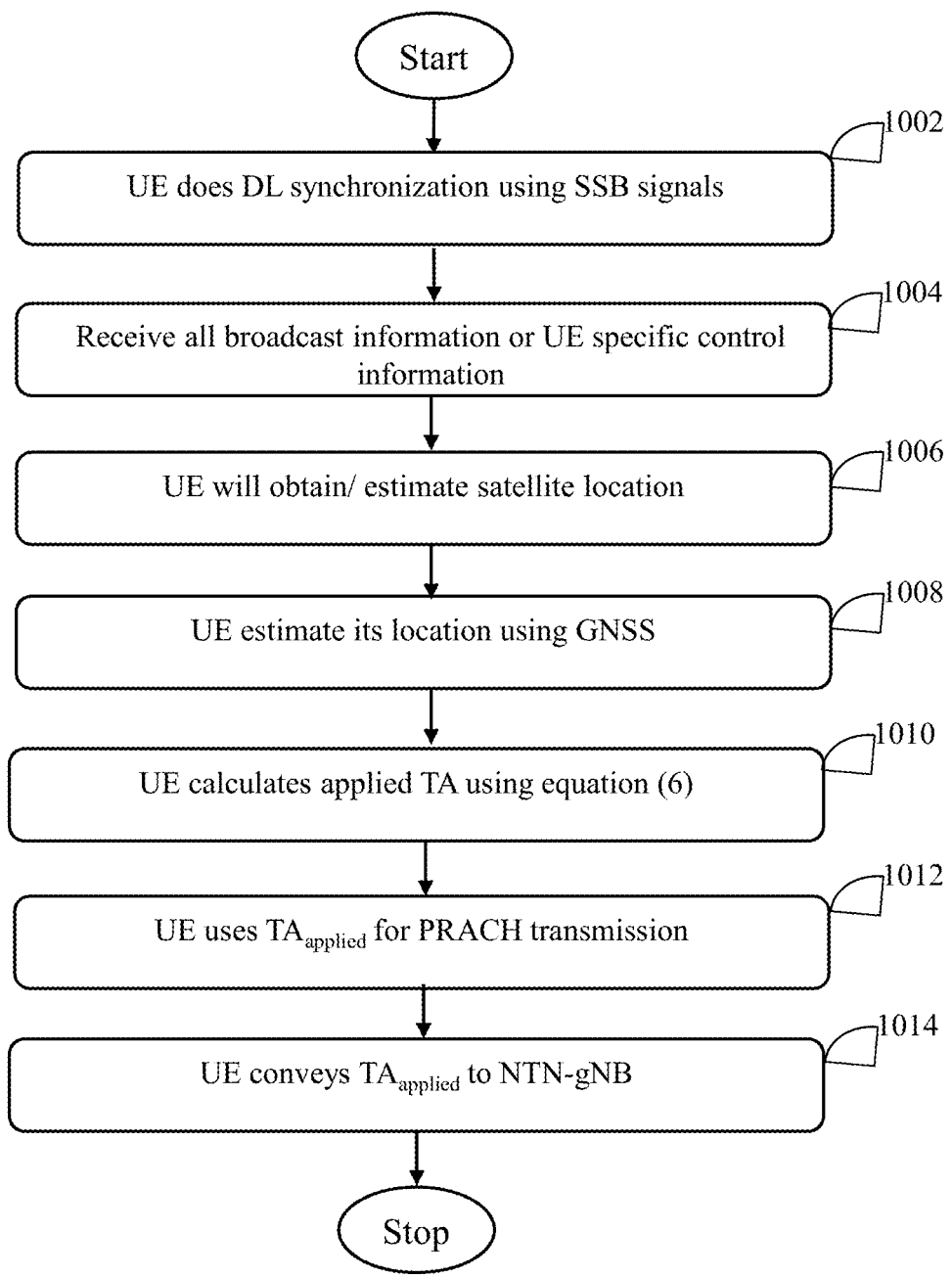

FIGS. 8-10 depicts different methods of determining TA by a UE having Global Navigation Satellite System (GNSS) capability, in accordance with different embodiments of the present disclosure.

In a first implementation, as illustrated in FIG. 8, an NTN UE performs DL synchronization using SSB signals, at step 802. The UE receives broadcast information or UE specific control information over a broadcast channel, at step 804. The broadcast information includes at least one of the satellite ephemeris, location coordinates, velocity magnitude & vector, clock timing reference, source of reference, min & max TA ($TA_{min}$ and $TA_{max}$) per beam/cell and feeder link delay including gNB-SATGW delay. The UE determines a location of a satellite, at step 806. At step 808, the UE measures its own location/co-ordinate using the GNSS. Using the received information from NTN-gNB, the UE estimates the NTN-gNB/satellite location and estimate the distance from NTN-gNB/satellite. Based on the location of the satellite and its own location, the UE calculates the TA estimate, at step 810. At step 812, the UE quantizes the estimated TA ($TA_{est}$) using the predefined step size ($TA_{step}$). $TA_{step}$ will be equal to at least one of the Cyclic Prefix (CP) duration of the physical random access preamble configured to the UE, one of the possible CP duration based on the frequency band of operation and any other specific value conveyed by NTN-gNB to the UE. UE divides the estimated TA with the $TA_{step}$ and floors it to the lower integer to get the total number of steps in multiples of $TA_{step}$. The final value of $TA_{applied}$ will be the number of steps multiplied with the step size. This final value of TA is to be applied by UE for its UL transmission including PRACH transmission, at step 814. This is formulated by equation (1) and (2) provided below, $$TA_{applied} = \left\lfloor \frac{TA_{est}}{T_{step}} \right\rfloor * T_{step} - TA_{margin} \qquad (1)$$

$$TA_{applied} = \left\lfloor \frac{TA_{est}}{T_{cp_{rach}}} \right\rfloor * T_{cp_{rach}} - TA_{margin} \qquad (2)$$

In the above mentioned equations (1) and (2), $T_{cp_{rach}}$ is step size equal to CP duration of PRACH. This is configured by NTN-gNB to the UE and it will be at least configured PRACH preamble CP, maximum PRACH preamble CP or any other predefined value. $TA_{margin}$ is additional TA offset over step size configured to UE by NTN-gNB to align the PRACH occasion as per the NTN-gNB requirements or additional TA offset, $TA_{est}$ is estimated TA by UE and $TA_{applied}$ is the TA which UE applies in UL transmission. $N_{applied}$ is the number of steps UE will use to get the final TA ($TA_{applied}$) and is determined using the below provided equation (3). $TA_{applied}$ is then conveyed to the NTN-gNB as number of step size, at step 816.

$$N_{applied} = \left\lfloor \frac{TA_{est}}{T_{step}} \right\rfloor \qquad (3)$$

One advantage of the first implementation is that TA value that UE applies to its UL transmission will be quantized with predefined step size. This will assure that the value will be always less than the actual TA value which NTN-gNB will estimate as correction upon reception of PRACH and convey over RAR MAC-PDU in message 2 of RACH procedure. Step size will ensure that the residual TA that NTN-gNB needs to convey in RACH message 2 will be within the limited range. This will reuse the NR/Long term Evolution (LTE) signaling for NTN and no need of new modification for conveying the TA from NTN-gNB. Similarly, it will eliminate the need for negative correction of TA from NTN-gNB. Moreover, it will be always necessary that the gNB should know the applied TA value by UE in its UL transmission, for appropriate management of communication resources with the UE. For that, UE needs to convey the complete applied TA to gNB which will require larger bits resulting in overhead but, in this method, UE can convey only the number of steps in quantization to the NTN-gNB. This will reduce the required number of bits and hence reduce the signaling overhead.

In a second implementation, as illustrated in FIG. 9, UE uses the communicated $TA_{min}$ value to further reduce the number of steps as described in first implementation. All the steps 902 through 918 are performed similar to the steps 802 through 816 except the step 914 which utilizes equation (4) or (5). Specifically, UE divides the estimated TA minus $TA_{min}$ with the $TA_{step}$ and floor it to get the total number of steps which will be multiplied by $TA_{step}$. Then, the UE will add the $TA_{min}$ to it which will be a common value and broadcasted either in a beam specific or cell specific way to estimate the applied TA. The minimum TA value $TA_{min}$ is same for all the UEs within the beam or cell. The TA applied ($TA_{applied}$) is formulated by equation (4) and (5) below, $$TA_{applied} = \left\lfloor \frac{TA_{est} - TA_{min}}{T_{step}} \right\rfloor * T_{step} + TA_{min} - TA_{margin} \qquad (4)$$

$$TA_{applied} = \left\lfloor \frac{TA_{est} - TA_{min}}{T_{cp_{rach}}} \right\rfloor * T_{cp_{rach}} + TA_{min} - TA_{margin} \qquad (5)$$

One advantage of the second implementation is that, if UE needs to communicate the number of steps it has used to derive the TA, then required number of bits will be much lesser than the first implementation.

In a third implementation, as illustrated in FIG. 10, when acquiring the $TA_{min}$ from NTN-gNB is not possible and/or estimated TA by the UE is fairly accurate, the NTN-gNB can avoid quantization method described above in first and second implementations and ask UE to apply the estimated TA directly. At step 1002, the UE performs DL synchronization using SSB signals. The UE receives broadcast information or UE specific control information over a broadcast channel, at step 1004. The UE estimates satellite location, at step 1006. At step 1008, the UE measures its own location/co-ordinate using the GNSS. At step 1010, the TA is formulated by equation (6) mentioned below.

$$TA_{applied} = TA_{est} - TA_{margin} \qquad (6)$$

The UE uses such $TA_{applied}$ for PRACH transmission at step 1012 and conveys the $TA_{applied}$ to NTN-gNB at step 1014.

Figure 11:
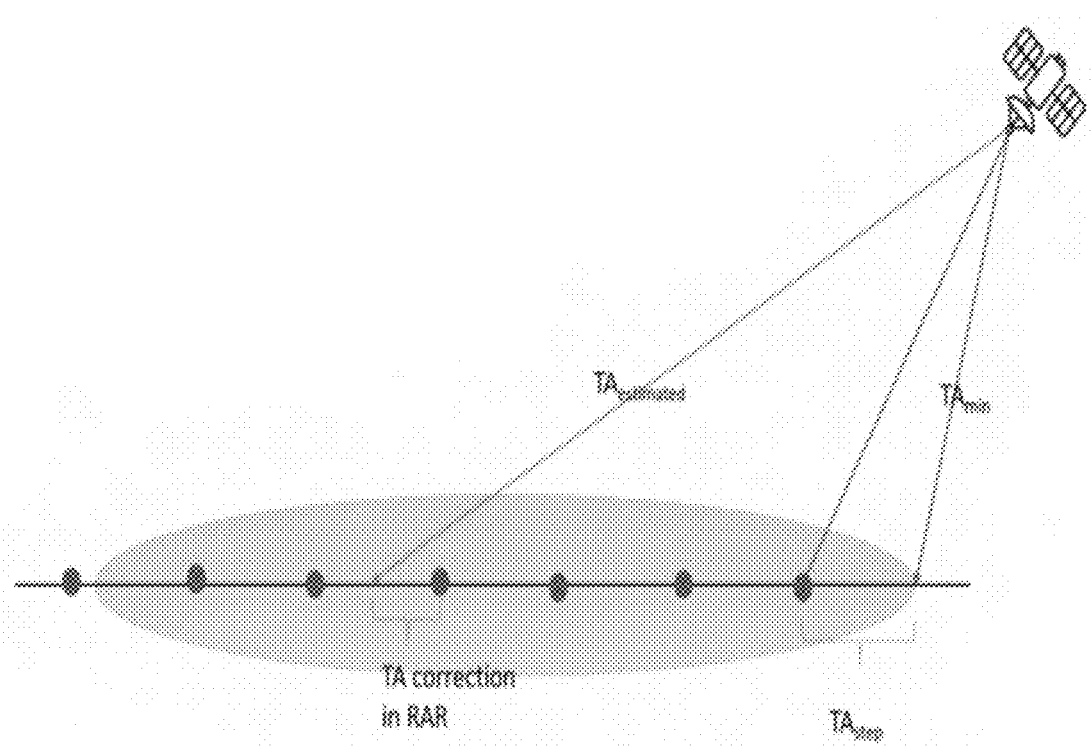
FIG. 11 illustrates a method to calculate TA for Up Link (UL) transmission of a User Equipment (UE) in NTN systems, in accordance with an embodiment of the present disclosure.

FIG. 11 illustrates the method to calculate the TA for the UL transmission of a UE in NTN systems, in accordance with an embodiment of the present disclosure. $TA_{margin}$ is additional value and is used to avoid any residual error due to overestimation of TA at UE.

Figure 12:
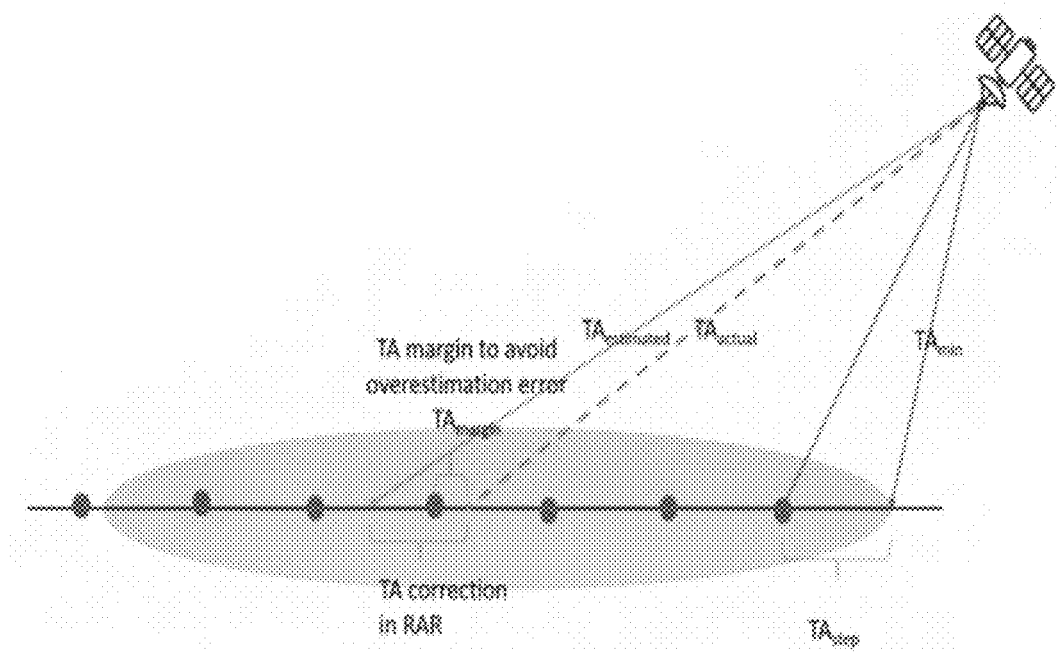
FIG. 12 illustrates the method to calculate the TA for UL transmission of a UE in NTN systems in presence of overestimation error, in accordance with an embodiment of the present disclosure.

FIG. 12 illustrates the method to calculate the TA for the UL transmission of a UE in NTN systems in presence of overestimation error, in accordance with an embodiment of the present disclosure. As illustrated in FIG. 12, $TA_{margin}$ will further reduce the TA to be applied by the UE to bring additional control over the PRACH occasion configuration by UE. By adjusting the $TA_{margin}$, BS can control the PRACH scheduling UE specifically or group specifically to avoid the collision between UE's PRACH occasion. This is essential even in BS or satellite with multiple beams. This $TA_{margin}$ can be limited from zero to step size or can be a predefined value. This can be conveyed UE specifically in dedicated message or can be common to all and broadcasted to all or few UEs within the cell or beam. If $TA_{margin}$ is depending on step size then value conveyed by NTN-gNB can be chosen from a predefined set for example, $TA_I$=[0, 0.25, 0.5, 0.75, 1] as multiplication factor to the step size. The value of $TA_{margin}$ is calculated from $TA_I$ using below provided equation (7).

$$TA_{margin} = TA_{step} * TA_I \qquad (7)$$

Further, NTN-gNB will provide the rate of change in satellite location and rate of change in feeder link delay or UE can estimate it based on velocity vector provided by the NTN-satellite. These can be provided in terms of rate of change of minimum TA ($\Delta TA_{min}$) and rate of change of maximum TA ($\Delta TA_{max}$) or individual rate of change in satellite location and feeder link. This will modify the equation of $TA_{applied}$ as mentioned in below provided equation (8).

$$TA_{applied} = TA_{applied} + \Delta TA_{rateChange} * t \quad (8)$$

Figure 13:
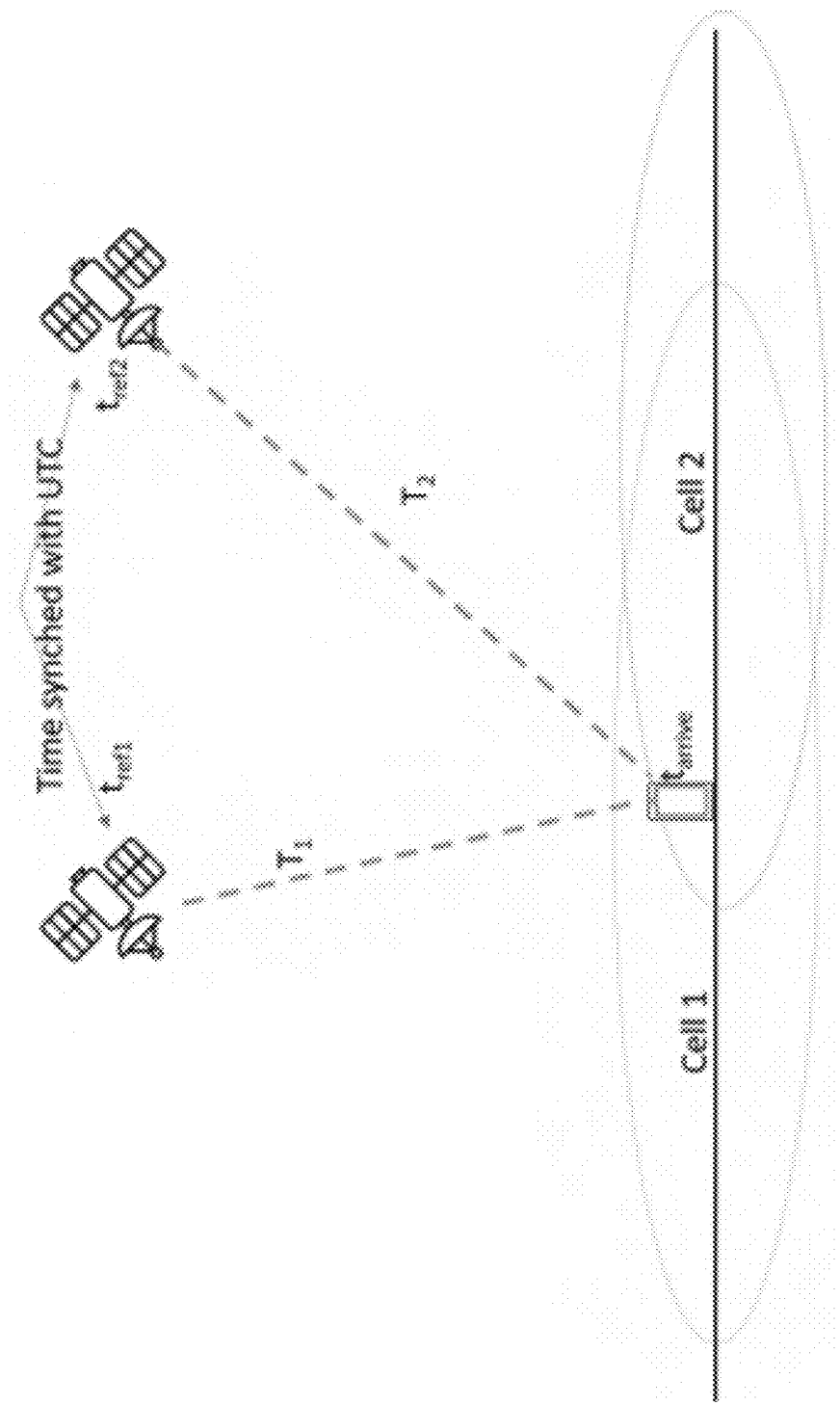
FIG. 13 illustrates the method to calculate the TA for the UL transmission of a UE without GNSS assistance in NTN systems, in accordance with an embodiment of the present disclosure.

In certain scenarios, the NTN-UE may not have GNSS capability. In such scenarios, the NTN-UE needs to be assisted by the NTN-gNBs. FIG. 13 illustrates a method to calculate the TA for UL transmission of a UE without GNSS assistance in NTN systems. The TA is determined using multilateralization technique where multiple NTN-satellite participate to determine the TA.

In such implementation, NTN-gNB based time of flight measurement over predefined reference signal in the DL should be configured. In multilateralization or triangulation technique, two or more NTN-gNBs transfer the signal to the NTN-UE. The NTN-UE calculates the time of flight and ultimately the timing advance by scaling it with factor two. Ephemeris of the NTN-gNB/satellite is used to detect the satellite location then using the clock reference of symbol boundary in broadcast message to detect the time of flight from each satellite using its own clock. UE clock should be assumed error prone and should be modelled while calculating the time of flight. Multilateralization technique will help here as the clock error will not vary across different NTN-satellites/gNBs. This can be formulated as described below.

Assume $t_{ref1}, t_{ref2}, \ldots t_{refN}$ are N time references that NTN-gNBs/satellite will transfer to UEs and $T_1, T_2, \ldots, T_N$ are the actual time of flight from NTN-gNB/satellite to UE. If $t_{arrive}$ is the time at which signal is received at UE from N NTN-gNBs/satellite (assuming they are transmitting at same time but not necessarily) and $b_u$ is the clock error at UE, then, $$t_{ref1} - t_{arrive} = (\sqrt{(x_{ue}-x_1)^2+(y_{ue}-y_1)^2+(z_{ue}-z_1)^2})/c + b_u \quad (9.1)$$

$$t_{ref2} - t_{arrive} = (\sqrt{(x_{ue}-x_2)^2+(y_{ue}-y_2)^2+(z_{ue}-z_2)^2})/c + b_u \quad (9.2)$$

$$t_{refN} - t_{arrive} = (\sqrt{(x_{ue}-x_1)^2+(y_{ue}-y_N)^2+(z_{ue}-z_1)^2})/c + b_u \quad (9.N)$$

$$T_i = (\sqrt{(x_{ue}-x_i)^2+(y_{ue}-y_i)^2+(z_{ue}-z_i)^2})/c \quad (10)$$

These equations can be solved simultaneously to get the UE location ($x_{ue}, y_{ue}, z_{ue}$). Here minimum four equations are necessary as there are four unknowns in the set of equations. ($x_i, y_i, z_i$) is the location of the $i^{th}$ NTN-gNB/satellite. Once the estimated TA ($T_i$) is calculated from each satellite it can be scaled by two to get the timing advance. Then the methods described above may be used for calculating actual TA value and same mechanism of reporting can be utilized for this scenario as well.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method for performing Uplink (UL) time synchronization in a Non-Terrestrial Network (NTN) based communication network, the method comprising:
    performing Downlink (DL) synchronization using Synchronization Signal Block (SSB) signals;
    receiving, by a UE (102), at least one information from an NTN Base Station (BS) (104);
    obtaining a location information of a satellite using the at least one information received by the UE (102);
    estimating the location of the UE (102) using one of Global Navigation Satellite System (GNSS) receiver of the UE (102) and by processing at least one reference signal received by the UE (102) from multiple NTN BS (104), using at least one multilateration technique and Real-Time Kinematic (RTK);
    determining Timing Advance (TA) estimate using the location of the satellite and location of the UE (102);
    determining TA applied using the TA estimate and TA margin, wherein the TA margin is a value ranging from zero to a step size value (TAstep);
    transmitting, by the UE (102), a Physical Random Access Channel (PRACH) based on the TA applied;
    reporting, by the UE (102), an information related to the TA applied to the NTN-BS (104);
    estimating, by the NTN-BS (104), residual TA using the reported information related to the TA applied and the detected PRACH and
    indicating the residual TA to the UE (102) for subsequent UL transmissions, thereby achieving the UL time synchronization in the NTN based communication network.

2. The method as claimed in claim 1, wherein the at least one information received from the NTN BS (104) comprises at least one of the satellite ephemeris, location coordinates, velocity magnitude and vector, clock timing reference, source of reference, minimum and maximum TA per beam or cell, TA margin, step size, rate of change of satellite location co-ordinates, satellite velocity vector with reference co-ordinates, rate of change of minimum TA, rate of change of maximum TA, feeder link delay including BS-satellite-gateway (SAT-GW) delay, and rate of change of feeder link delay.

3. The method as claimed in claim 2, wherein the at least one information is signalled by the NTN-BS (104) over at least one of the broadcast channel and UE specific control channel.

4. The method as claimed in claim 1, wherein the TA applied is determined as a difference between the TA estimate and the TA margin.

5. The method as claimed in claim 1, comprising quantizing the TA estimate based on a at least one of the predefined step size (TAstep) and minimum TA signalled to the UE (102).

6. The method as claimed in claim 5, wherein the minimum TA is the minimum timing advance from the NTN-BS (104) to the Earth's surface within its footprint.

7. The method as claimed in claim 5, comprising the predefined TAstep configured as one of a cyclic prefix duration (Tcp) associated to a possible PRACH configuration and step size provided in the broadcast information.

8. The method as claimed in claim 7, wherein one of the possible PRACH configuration is configured PRACH configuration.

9. The method as claimed in claim 1, wherein the information related to the TA applied is reported to the NTN-BS (104) as a number of step size.

10. The method as claimed in claim 9, wherein the number of step size is determined as a factor of the TA estimate and the TAstep.

11. The method as claimed in claim 1, wherein the information related to the TA applied is updated based on a relative velocity of the satellite with the UE (102), determined using at least one of the rate of change of satellite location co-ordinates, satellite velocity vector with reference co-ordinates, rate of change of minimum TA, rate of change of maximum TA, and rate of change of feeder link delay.

12. A system for performing Uplink (UL) time synchronization in a Non-Terrestrial Network (NTN) based communication network, the system comprising:
   a processor; and
   a memory connected with the processor, wherein the memory comprises programmed instructions for allowing the processor to:
      perform Downlink (DL) synchronization using Synchronization Signal Block (SSB) signals;
      receive, by a UE (102), at least one information from an NTN-Base Station (BS) (104);
      obtain a location information of a satellite using the at least one information received by the UE;
      estimate the location of the UE (102) using one of Global Navigation Satellite System (GNSS) receiver of the UE (102) and by processing at least one reference signal received by the UE (102) from multiple NTN-BS (104), using at least one multilateration technique and Real-Time Kinematic (RTK);
      determine Timing Advance (TA) estimate using the location of the satellite and location of the UE (102);
      determine TA applied using the TA estimate and TA margin, wherein the TA margin is a value ranging from zero to a step size value (TAstep);
      transmit, by the UE (102), a Physical Random Access Channel (PRACH) based on the TA applied;
      report, by the UE (102), an information related to the TA applied to the NTN-BS (104);
      estimate, by the NTN-BS (104), the residual TA using the reported information related to the TA applied (104) and the detected PRACH; and
      indicate the residual TA to the UE (102) for subsequent UL transmissions, thereby achieving the UL time synchronization in the NTN based communication network.

* * * * *

UNITED STATES PATENT AND TRADEMARK OFFICE
CERTIFICATE OF CORRECTION

PATENT NO. : 11,910,339 B2
APPLICATION NO. : 17/451952
DATED : February 20, 2024
INVENTOR(S) : Abhijeet Abhimanyu Masal et al.

It is certified that error appears in the above-identified patent and that said Letters Patent is hereby corrected as shown below:

In the Claims

In Column 14, Line 15, Claim 12, delete "(104)" and insert -- to the NTN-BS (104) --, therefor.

Signed and Sealed this
Sixteenth Day of July, 2024

Katherine Kelly Vidal
*Director of the United States Patent and Trademark Office*